United States Patent [19]

Clementoni

[11] Patent Number: 4,647,313

[45] Date of Patent: Mar. 3, 1987

[54] PAVING ASPHALT

[75] Inventor: Dominick Clementoni, Union, N.J.

[73] Assignee: Exxon Research and Engineering Company, Florham Park, N.J.

[21] Appl. No.: 788,452

[22] Filed: Oct. 17, 1985

[51] Int. Cl.$^4$ .............................................. C08L 95/00
[52] U.S. Cl. ................................ 106/281 R; 106/246; 106/248; 106/273 R
[58] Field of Search ............ 106/246, 248, 273, 281 R

[56] References Cited

U.S. PATENT DOCUMENTS

| | | | |
|---|---|---|---|
| 2,517,564 | 8/1950 | Harman et al. | 106/273 |
| 2,632,712 | 3/1953 | Lemmon et al. | 106/269 |
| 2,673,814 | 3/1954 | MacLaren | 106/269 |
| 3,539,370 | 11/1970 | Pitchford | 106/278 |
| 3,956,001 | 5/1976 | Pitchford | 106/273 |
| 4,373,960 | 2/1983 | Ward, Jr. | 106/281 |
| 4,422,878 | 12/1983 | Fry | 106/219 |
| 4,437,896 | 3/1984 | Partanen | 106/273 |
| 4,453,980 | 6/1984 | Ward | 106/281 |

FOREIGN PATENT DOCUMENTS 1379392  1/1975  United Kingdom .

Primary Examiner—Amelia B. Yarbrough
Attorney, Agent, or Firm—Edward H. Mazer

[57] ABSTRACT

An improved asphaltic cement particularly suited for paving applications and a method for producing same are described. The asphalt comprises between about 80 and about 99 wt. % of a residuum having a viscosity of at least 6000 poise at 60° C. and about 1 to about 20 wt. % of a fatty acid.

21 Claims, No Drawings

PAVING ASPHALT

BACKGROUND OF THE INVENTION

This invention is directed at an asphaltic composition and a method for producing the asphaltic composition. More specifically, the present invention is directed at an asphaltic composition suitable for use in combination with aggregate as a paving composition having a reduced gas oil content.

One source for asphalt is the residuum from the fractionation of crude oil. During typical crude oil processing, the crude is passed through a series of distillation towers which remove the more volatile components from the hydrocarbon feed. In prior art processes, the amount of volatile components, such as gas oil, which could be removed from the feed was limited by the final viscosity of the residuum. While the unit value of gas oil generally exceeds the unit value of residuum for asphaltic applications, removal of an excessive amount of gas oil from the residuum may increase the viscosity of the residuum above the allowable maximum for asphaltic compositions, such as paving asphalt. In paving applications, excessively viscous asphalt is not desired, since the asphalt would not meet product specifications and would not exhibit the desired properties, such as flexibility, at the temperature extremes. Typically, in paving applications, the viscosity of the vacuum residuum or bitumen utilized in paving applications ranges between about 400 and about 4800 poise at 60° C.

The admixture of fatty acids with bitumen in asphaltic paving compositions is known for improving the adhesion of the asphalt to aggregate.

U.S. Pat. No. 2,517,564 discloses the addition of polymerized sulfides and fatty acids to asphalt. This patent discloses that the concentration of each additive should range between 0.2% and 3% by weight.

U.S. Pat. No. 2,673,814 discloses the addition of from about 0.1 to about 30 wt.%, preferably about 3 to about 10 wt.% of the propane insoluble fraction obtained in the propane extraction of crude fatty materials, such as animal, marine and vegetable fats, fatty oils or fatty acids split therefrom the bitumen to improve asphalt adherence to aggregate.

U.S. Pat. Nos. 4,422,878 and 3,539,370 disclose that the addition of fatty acids improves the physical properties when fiber or metal compounds are added to the asphalt to improve the paving composition.

U.S. Pat. No. 4,436,896 discloses the manufacture of a synthetic asphalt by admixing 5-60 wt. % gilsonite with 95-40 wt. % tall oil or tall oil pitch.

U.S. Pat. No. 3,956,001 discloses the use of stearic acid in combination with another additive to retard surface hardening or skin formation when admixed with asphalts having a viscosity of about 2000 poise at 140° F.

U.S. Pat. Nos. 2,632,712, 4,373,960, 4,453,980 and U.K. Pat. No. 1,379,392 all disclose cut back asphaltic compositions including fatty acids which are useful as liquids for surface dressing of roads.

However, none of the above-noted patents discloses the admixture of fatty acids with an asphaltic residuum having a viscosity of at least 6000 poise at 60° C. to reduce the viscosity.

Accordingly, it would be desirable to remove additional volatile compounds, such as gas oil, from a residuum, yet still be able to utilize the residuum in asphaltic paving compositions meeting current asphaltic product specifications.

It would also be desirable to provide a method for reducing the viscosity of asphaltic compositions into the range of current asphaltic cement product specifications without the addition of gas oil.

It would also be desirable to remove gas oil from asphaltic compositions and counterbalance the resulting viscosity increase by the addition of reduced quantities of commercially less valuable compositions.

It also would be desirable to provide an asphaltic composition having improved aggregate adhesion which avoids the use of costly additives required with conventional asphaltic compositions.

The present invention is directed at an asphaltic composition and method of preparing same comprising:

A. about 80 to about 99 wt. % of a hydrocarbon residuum having a viscosity of at least 6000 poise at 60° C.; and, B. about 1 to about 20 wt. % fatty acid.

SUMMARY OF THE INVENTION

The present invention is directed at an improved asphaltic composition comprising:

A. about 80 to about 99 wt. % of a residuum having a viscosity of at least 6000 poise at 60° F.; and, B. about 1 to about 20 wt. % fatty acid.

A preferred composition comprises a residuum having a viscosity of at least 7000 poise at 60° C., more preferably at least 8000 poise at 60° C. The fatty acid preferably comprises $C_{10}$–$C_{30}$ fatty acids, more preferably $C_{14}$–$C_{20}$ fatty acids. Preferred fatty acids include stearic acid, palmitic acid, oleic acid, animal fatty acid and mixtures thereof, with stearic acid and animal fatty acid being particularly preferred. The fatty acid content of the asphaltic composition preferably comprises about 1 to about 20 wt.% fatty acid, more preferably about 2 to about 6 wt.% fatty acid.

The present invention also is directed at a method for producing an asphaltic composition having a reduced gas oil content from a hydrocarbon feed comprising:

A. passing hydrocarbon feed into a distillation system wherein the hydrocarbon feed is separated into one or more distillate fractions and a residuum fraction, the residuum fraction having a viscosity of at least 6000 poise at 60° C.; and B. admixing a fatty acid with the residuum so produced.

In a preferred method, the residuum is the bottoms from a vacuum distillation column having an atmospheric equivalent volatilization temperature (AEVT) of at least 425° C., preferably at least 545° C.

The fatty acid preferably is added to the residuum exiting from the distillation system during the transfer of the residuum from the distillation column to the asphaltic storage facilities. The fatty acid preferably is added during the cooling of the residuum from the bottoms temperature of the distillation column to the asphaltic storage temperature.

DETAILED DESCRIPTION OF THE INVENTION

In the refining of crude oil, the crude oil typically is passed through a series of distillation columns to remove volatile fractions. The resulting bottoms fraction, or residuum, is a relatively low value fraction which often is used for processing into roofing and paving binders. While it may be desirable to operate the final distillation column at a relatively high bottoms temperature to remove volatile components, such as gas oil from the bottoms, removal of excessive amounts of gas oil may increase the viscosity of the residuum sufficiently such that the residuum is not suitable for use as paving asphalt. "Dumbbelling", or back-blending of residuum with lighter fractions, has been utilized in the past to reduce the viscosity of asphaltic compositions of excessively high viscosity to a viscosity within product specifications by the addition of relatively volatile gas oil.

Surprisingly, it has been found that removal of relatively large quantities of gas oil from residuum can be counterbalanced by the addition of substantially smaller quantities of fatty acids to produce an asphaltic cement within product specifications.

The fatty acid may be a $C_{10}$–$C_{30}$ fatty acid, preferably a $C_{14}$–$C_{20}$ fatty acid and more preferably a $C_{16}C_{18}$ fatty acid. The fatty acid preferably is selected from the group consisting of stearic acid, palmitic acid, oleic acid, animal fatty acids and mixtures thereof.

In the manufacture of asphaltic cements in accordance with the present invention, the atmospheric equivalent vaporization temperature of the vacuum distillation column is maintained at a temperature of at least 425° C., preferably at least 545° C.

In the following Comparative Examples and Examples, the utility of the present invention is demonstrated in producing asphaltic cements having acceptable phsyical properties while having substantially reduced gas oil contents.

Data is presented in tabular form in Table 1 of the product specifications for AC-20 grade asphaltic cement. The composition and physical properties of asphaltic cements described in the Comparative Examples and in the Examples also are presented in Table I. The tests performed on the asphaltic cements are well known by ones skilled in the art.

The viscosity tests, conducted at 60° C. and 135° C. (275° F.) are described in ASTM test methods D2171 and D2170. The purpose is to prescribe limiting values of consistency at these two temperatures. The 60° C. temperature was chose to approximate the maximum asphalt pavement surface temperature. The 135° C. temperature was chosen to approximate mixing and laydown temperature for hot asphalt pavements.

The penetration test, ASTM D5, measures the amount of penetration of a needle in decimillimeters of a sample maintained at 77° F. having a 100 g load. It is an empirical measure of consistency.

The Oliensis spot test is used to determine whether there is any cracked materials in the asphalt. This test is conducted by dissolving asphalt in naphtha and placing a drop of this solution on a filter paper.

The flash test indicates the temperature to which the asphalt sample may be safely heated without an instantaneous flash in the presence of an open flame. This test is described in ASTM D92.

The thin film oven (TFO) test, described in ASTM D1754, is a procedure intended to subject a sample of asphalt to hardening conditions approximating those that occur in normal hot-mix plant operations. Viscosity and paenetration tests made on the sample before and after the TFO test are considered to be a measure of the anticipated hardening.

The disclosures of the test methods noted hereinabove are incorporated herein by reference.

COMPARATIVE EXAMPLE I

Blends of Alaskan North Slope (ANS) and Maya crudes were processed to produce a straight run asphalt meeting the specifications of AC-20 asphaltic cement by maintaining a bottoms temperature in a vacuum distillation column. The physical properties of the straight run asphalts produced using 60/40 ANS/Mayan (Feed 1) at an atmospheric equivalent vaporization (AEV) temperature of about 501° C., and the product specifications for AC-20 are set forth in Table 1. Specification grade AC-20 also was produced using 70/30 ANS/Mayan (Feed 2) at an AEV of 518° C.

EXAMPLE I

In this Example, the same feeds and the same vacuum distillation zone were utilized as in the Comparative Example. For Feed 1 the AEV temperature was raised from about 501° C. of the Comparative Example to about 528° C. This resulted in an increase in the viscosity of the residuum from about 1859 to about 6230 poise at 60° C. Computer simulations have estimated that this reduced the yield on bottoms from about 35.8 wt.% yield on bottoms to about 32.5 wt.%, about a 9.27% reduction. As used herein, the term "yield on bottoms" refers to the fraction of the feed entering the distillation zone which exits as bottoms. For Feed 2 the AEV temperature was raised from 518° C. to about 545° C. resulting in an increase in viscosity from about 2000 to about 6469 poise at 60° C. Computer simulations have estimated that this increase in bottoms AEV temperature for Fuel 2 reduced the yield on bottoms from about 32.3 wt.% to about 29.1 wt.% of the entering feed, a reduction of about 10%. As shown by the data in Table I, addition of only about 3–4 wt.% stearic acid or animal fatty acid to the asphalt reduced the viscosity of the residua from Feeds 1 and 2 to the product specification range for AC-20. Thus, a reduction of about 9–10 wt.% in the yield on bottoms could be counterbalanced by the addition of only about 3–4 wt.% stearic acid and/or fatty acid.

The asphaltic product resulting from the addition of a light cut gas oil to a hardened asphaltic material to reduce the viscosity frequently is referred to as a "dumbbell blend". It is known in the art that dumbbell asphaltic blends may have a lower maximum recoverable gas oil content than conventional asphaltic cements of the same grade. This is attributable to the use of a lighter cut gas oil in the "dumbbell blend" than is normally present in a conventional asphaltic cement of the same grade.

COMPARATIVE EXAMPLE 2

In this Comparative Example hardened residua produced from Feed 1 and from Feed 2, having viscosities of about 6230 and 6469 poise, respectively, at 60° C. were reduced to acceptable AC-20 grade asphaltic cement viscosities of about 1915 and 2057 poise, respectively, at the same temperature by the addition of 5.5 and 6.0 wt% distillate, respectively, where the distillate had a boiling range of about 305° to about 550° C. The results also are presented in Table I.

From a comparison of the compositions of Table I, it can be seen that it was possible to reduce the viscosity of Feed 1 and Feed 2 by the use of less stearic acid or fatty acid than gas oil.

TABLE I

| Feed Utilized | Feed 1 | | | Feed 2 | | | Straight Run Asphalt Using Feed 1 | Product Specifications |
| --- | --- | --- | --- | --- | --- | --- | --- | --- |
| | Stearic Acid | Animal Fatty Acid | Dumbbell Blend | Stearic Acid | Animal Fatty Acid | Dumbbell Blend | | |
| Product Content (wt. %) | | | | | | | | |
| Hard Residuum | 96.0 | 97.0 | 94.5 | 97.0 | 96.5 | 94.0 | | |
| Stearic Acid | 4.0 | — | — | 3.0 | — | — | | |
| Animal Fatty Acid | — | 3.0 | — | — | 3.5 | — | | |
| Gas Oil | — | — | 5.5 | — | — | 6.0 | | |
| Physical Properties | | | | | | | | |
| Viscosity @ 60° C., P. | 1790 | 2385 | 1915 | 2361 | 1972 | 2057 | 1859 | 2000 ± 400 |
| Viscosity @ 135° C., cSt | 406 | — | 395 | 468 | 434 | 412 | 392 | 350 min |
| Penetration, 25/100/5 | — | 74 | 79 | 66 | 76 | 68 | 69 | 60 min |
| Oliensis Spot | Neg | — | Pos | Neg | Neg | — | Neg | Neg |
| Flash, °C., COC | 313 | — | 305 | — | 321 | 335 | 321 | 232 |
| TFOT % loss | 0.48 | 0.34 | 0.35 | 0.33 | 0.37 | 0.15 | 0.00 | 0.5 max |
| Viscosity @ 60° C., P. | 5407 | 5975 | 5913 | 5229 | 4749 | 4540 | 4390 | 8000 max |
| Ductility @ 15.6° C., cm | 84 | 48 | 19 | 100+ | 100+ | 82 | 40 | 20 min |

Feed 1 Viscosity 6230 poise at 60° C.
Feed 2 Viscosity 6469 poise at 60° C.

The amounts of additional gas oil which can be stripped from a residuum and replaced by a smaller quantity of fatty acid will vary depending upon the particular crude oil processed.

The particular fatty acid utilized is not critical. Among the preferred fatty acids are stearic acid, palmitic acid, oleic acid, and animal fatty acids, with stearic acid being particularly preferred.

The asphaltic cement of the present invention preferably will comprise between about 80 and about 99 wt% residuum and about 1 to about 20 wt% fatty acid. In a preferred composition the residuum content may range between about 94 and about 98 wt%, and the fatty acid content may range between about 2 and about 6 wt%.

To assure good mixing of the fatty acid with the residuum, the fatty acid preferably is admixed with the residuum while the residuum is at an elevated temperature, i.e. at least about 135° C., and at a relatively low viscosity. This preferably is accomplished by monitoring the viscosity of the residuum exiting the vacuum distillation column and adjusting the rate of addition of fatty acid, as necessary, to maintain the viscosity of the resulting asphaltic composition within the desired limits. Typically the residuum exiting the vacuum distillation column is cooled prior to storage by passage through heat exchange means to thereby recover thermal energy. Since the temperature at which the residuum exits from the vacuum distillation column may be above the boiling point of the particular fatty acid utilized, it may be desirable to admix the fatty acid with the residuum after the passage of residuum through heat exchange means. It may be necessary to prepare correlations of the asphaltic viscosities at various elevated temperatures with the viscosity at 60° C., which typically is the temperature utilized as the standard temperature for asphaltic viscometric measurement.

A paving composition utilizing the present invention typically will have the following composition and preferred composition ranges:

| Component | Range wt. % | Preferred Range wt. % |
| --- | --- | --- |
| Aggregate | 90-99 | 94-98 |
| Residuum | 1-10 | 4-6 |
| Fatty Acid | 0.03-0.40 | 0.1-0.25 |

In addition to permitting a reduction in the gas oil content of the residuum utilized, the fatty acid also improves the aggregate bonding to the asphaltic cement.

The adherency of an asphaltic cement of AC-20 specification having 4 wt% fatty acid also was found to have superior bonding properties as compared to a conventional AC-20 asphaltic cement to which fatty acid had not been added by use of the Virginia Test method for heat stable additive (VTM-13), the disclosure of which is incorporated herein by reference.

What is claimed is:

1. An asphaltic composition comprising:
   A. about 80 to about 99 wt% of a residuum having a viscosity of at least 6000 poise at 60° C.; and
   B. about 1 to about 20 wt% of a fatty acid.

2. The composition of claim 1 wherein the residuum has a viscosity of at least 7000 poise at 60° C.

3. The composition of claim 2 wherein the residuum has a viscosity of at least 8000 poise at 60° C.

4. The composition of claim 1 wherein the fatty acid comprises $C_{10}$–$C_{30}$ fatty acids.

5. The composition of claim 4 wherein the fatty acid comprises $C_{14}$–$C_{20}$ fatty acids.

6. The composition of claim 5 wherein the fatty acid is selected from the group consisting of stearic acid, palmitic acid, oleic acid, animal fatty acid and mixtures thereof.

7. The composition of claim 6 wherein the fatty acid is stearic acid.

8. A method for producing an asphaltic composition having a reduced gas oil content comprising:
   A. passing a hydrocarbon feed to a distillation system wherein the feed is separated into one or more distillate fractions and a residuum fraction having a viscosity of at least 6000 poise at 60° C.; and
   B. admixing with the residuum fraction a fatty acid.

9. The method of claim 8 wherein the distillation system comprises a vacuum distillation column operated at an atmospheric equivalent vaporization temperature of at least 425° C.

10. The method of claim 9 comprising operating the distillation column at an atmospheric equivalent vaporization temperature of at least 545° C.

11. The method of claim 10 wherein about 1 to about 20 wt% of fatty acid is mixed with the residuum exiting from the vacuum distillation column.

12. The method of claim 11 wherein the residuum is at a temperature of at least 135° C. during the addition of the fatty acid to the residuum.

13. A method for producing an asphaltic composition having a reduced gas oil content comprising:
  A. passing a hydrocarbon feed into a distillation system wherein the feed is separated into a distillate fraction and a residuum fraction; and,
  B. monitoring the viscosity of the residuum fraction exiting the distillation system and reducing the viscosity of the residuum fraction by the addition of fatty acid.

14. The method of claim 13 wherein the viscosity is maintained within predetermined limits by regulation of the rate of addition of fatty acid.

15. The method of claim 14 wherein the viscosity of the residuum exiting the distillation system is at least 6000 poise at 60° C. prior to the addition of fatty acid.

16. The method of claim 16 wherein the residuum exiting from the distillation system is passed through heat exchange means prior to the addition of the fatty acid.

17. A method for producing an asphaltic composition having a reduced gas oil content comprising:
  A. passing a hydrocarbon feed into a distillation system wherein the feed is separated into a distillate fraction and a residuum fraction; and,
  B. adding fatty acid to the residuum exiting the distillation system to produce an asphaltic composition; and
  C. monitoring the viscosity of the asphaltic composition and adjusting the rate of addition of fatty acid to maintain the viscosity of the asphaltic composition between predetermined limits.

18. The method of claim 17 wherein the residuum exiting from the distillation system is passed through a heat exchange means prior to the addition of the fatty acid.

19. The method of claim 18 wherein the fatty acid is added after the temperature of the residuum has been reduced to below the boiling point of the fatty acid.

20. A paving composition comprising:
  A. about 90 to about 99 wt.% aggregate;
  B. about 1 to about 10 wt.% vacuum residuum having a viscosity of at least 6000 poise at 60° C.; and,
  C. about 0.03 to about 0.40 wt.% fatty acid.

21. The paving composition of claim 20 comprising:
  A. about 94 to about 98 wt.% aggregate;
  B. about 4 to about 6 wt.% residuum; and,
  C. about 0.1 to about 0.25 wt.% fatty acid.

* * * * *